United States Patent [19]
Wang

[11] Patent Number: 5,848,742
[45] Date of Patent: *Dec. 15, 1998

[54] GOLF ACCESSORY HOLDER ATTACHABLE TO A GOLF CART FOR HOLDING A SCORECARD, A TIMEPIECE, AND/OR A BEVERAGE

[76] Inventor: Eric Wang, 147-20 35th Ave., Apt. 5F, Flushing, N.Y. 11354

[*] Notice: The term of this patent shall not extend beyond the expiration date of Pat. No. 5,678,740.

[21] Appl. No.: 914,358

[22] Filed: Aug. 19, 1997

Related U.S. Application Data

[63] Continuation-in-part of Ser. No. 564,558, Nov. 29, 1995, Pat. No. 5,678,740.

[51] Int. Cl.$^6$ ................................................ B60R 11/00
[52] U.S. Cl. ............................................................ 224/274
[58] Field of Search .................................. 224/274, 918, 224/919; D34/15

[56] References Cited

U.S. PATENT DOCUMENTS

| | | | |
|---|---|---|---|
| 4,645,105 | 2/1987 | Plumbridge | 224/269 |
| 5,160,134 | 11/1992 | McDonald | 273/32 B |
| 5,357,487 | 10/1994 | Coleman, III | 368/10 |
| 5,435,474 | 7/1995 | Lin | 224/274 |
| 5,678,740 | 10/1997 | Wang | 224/274 |

Primary Examiner—Renee S. Luebke
Attorney, Agent, or Firm—Galgano & Burke

[57] ABSTRACT

A holder attachable to a golf cart for holding a scorecard protected from the rain, a timepiece, and/or a beverage container such as a can or a cup. The holder includes a generally planar panel and a cover pivotally attached to the panel. The cover has an outer surface provided with a pair of resilient clips which define a first location for holding a scorecard. The panel has a top surface provided with a pair of resilient clips which define a second location for securing the scorecard. The cover is pivotal between a closed position covering the second location for holding and protecting the scorecard during rain and an open position for recording a score on the scorecard.

25 Claims, 6 Drawing Sheets

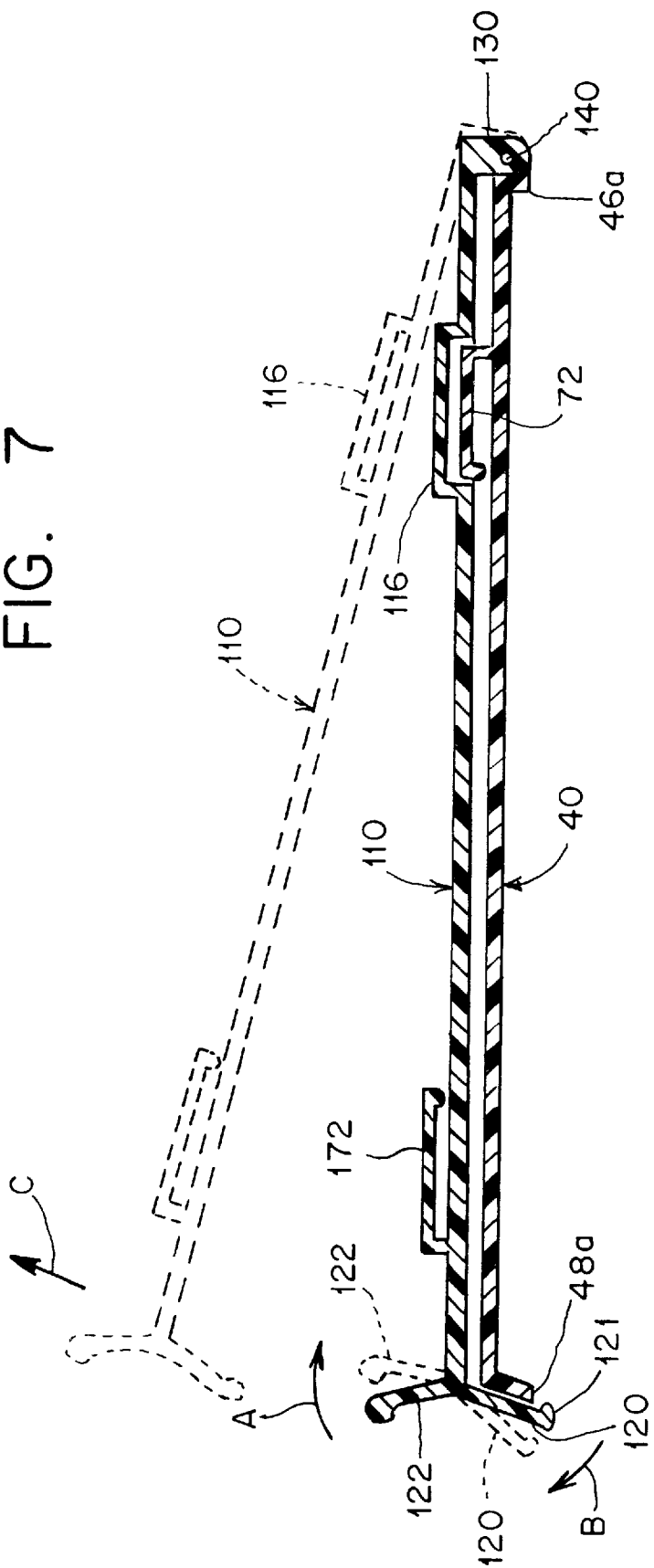

GOLF ACCESSORY HOLDER ATTACHABLE TO A GOLF CART FOR HOLDING A SCORECARD, A TIMEPIECE, AND/OR A BEVERAGE

RELATED APPLICATION

This application is a continuation-in-part of application Ser. No. 08/564,558, filed Nov. 29, 1995 now U.S. Pat. No. 5,678,740.

BACKGROUND OF THE INVENTION

The present invention relates generally to a golf accessory holder for holding one or more golf accessories and/or a beverage container. More particularly, the invention relates to a golf accessory holder attachable to a golf cart for holding a scorecard protected from the rain, a timepiece, and/or a beverage container such as a can or a cup.

Several devices have been devised for golfers to make the game of golf more enjoyable. For example, golf carts make the game of golf less strenuous for a golfer by enabling a golfer to easily wheel a golf bag with clubs around a golf course.

To further make the game of golf more enjoyable, a golfer will often place one or more beverages in a pocket of a golf bag prior to starting a round of golf because of the limited opportunity to later obtain a beverage during the round. However, after opening a beverage container, a golfer has no readily available place to set the open beverage container when hitting a golf ball or while walking from one golf hole to the next. Typically, a golfer will resort to placing the beverage container on the ground when hitting a golf ball. Afterwards, the golfer will pick up and hold the beverage container in one hand while using the other to wheel the golf cart to where his or her golf ball has landed.

As far as is known, there are no presently available golf accessory holders attachable to a golf cart which can hold a scorecard for recording a score during play of a round of golf wherein the scorecard is protected from the rain, a clock which is readily viewable for determining the time, and/or a beverage container, particularly an open beverage container.

SUMMARY OF THE INVENTION

Accordingly, it is an object of the present invention to provide a novel golf accessory holder attachable to a golf cart for holding a scorecard for readily recording a score or the number of strokes per hole during play of a round of golf.

It is another object of the present invention to provide a golf accessory holder attachable to a golf cart for holding a scorecard protected from rain by a cover which can be readily moved to allow recording a score or the number of strokes per hole during play of a round of golf.

It is another object of the present invention to provide a golf accessory holder attachable to a golf cart for holding a scorecard which may be readily moved from a first location where the scorecard is uncovered to a second location where the scorecard is covered and protected from rain during play of a round of golf.

It is also an object of the present invention to provide a golf accessory holder attachable to a golf cart having a clock which is readily viewable for determining the time.

It is a further object of the present invention to provide a golf accessory holder attachable to a golf cart for holding a scorecard in either a covered or uncovered location, and a timepiece.

It is still another object of the present invention to provide a golf accessory holder attachable to a golf cart for holding a scorecard, a timepiece, and an open beverage container in a stable substantially upright and level orientation, i.e., so that the contents of the beverage container will not spill out, when hitting a golf ball and while walking from one golf hole to the next.

It is yet another object of the present invention to provide a golf accessory holder attachable to a golf cart for conveniently releasably retaining a scorecard in either a covered or uncovered location, a pencil, golf balls and golf tees.

It is a further object of the present invention to provide a golf accessory holder which may be manufactured relatively simply and inexpensively for widespread sale and use by golfers.

Certain of the foregoing and related objects are readily obtained in a golf accessory holder attachable to an upper member of a golf cart adjacent to a handle thereof in which the holder comprises a generally planar panel comprising a top surface, golf cart attaching means for attaching the panel to an upper member of a golf cart adjacent to a handle thereof, means for releasably attaching a scorecard to the panel, a cover, and means for attaching the cover to the panel so that the cover is movable between a closed position covering the scorecard and an open position for recording a score on the scorecard.

Preferably, the cover comprises an outer surface and means for releasably attaching the scorecard to the outer surface of the cover comprising at least one resilient clip member attached to the outer surface to secure the scorecard to the cover between the resilient clip and the outer surface. The means for releasably attaching a score card to the panel comprises at least one resilient clip member attached to the top surface to secure the scorecard to the panel between the resilient clip and the top surface. Desirably, the panel and the cover comprise upper and lower edges, and the resilient clip member of the panel is disposed adjacent to an upper edge of the panel and the resilient clip member of the cover is disposed adjacent to a lower edge of the cover. Advantageously, the cover comprises a bottom surface having a recess disposed adjacent to and aligned with the resilient clip member of the panel when the cover is disposed in a closed position.

Preferably, the cover comprises means for releasably retaining the cover in a closed position comprising a downwardly depending resilient tab which releasably engages the panel in a snap-fit manner to retain the cover in a closed position. Desirably, the cover comprises an upwardly extending tab adjacent the downwardly depending resilient tab which, when the upwardly extending tab is pivoted, the downwardly depending tab disengages from the snap-fit engagement with the panel to thereby allow the cover to be moved to the open position.

Preferably, the means for attaching the cover to the panel comprises the cover being pivotal between a closed position covering the scorecard and an open position for recording a score on the scorecard wherein the panel comprises at least two downwardly depending tabs, the cover comprises at least two downwardly depending tabs, and the tabs being connectable via a pin. Desirably, the cover is formed from plastic and is transparent.

Advantageously, the holder further comprises at least one pair of downwardly depending elongated curved members attached to the panel for frictionally and releasably retaining a golf ball therebetween, a cylindrical sleeve extending through the panel and having an axial bore sized for releasably retaining a pencil therein, and at least one pair of spaced-apart upwardly extending elongated curved members attached to the top surface of the panel for frictionally and releasably retaining therebetween a golf tee.

Certain of the foregoing and related objects are also readily obtained in a golf accessory holder attachable to an upper member of a golf cart adjacent to a handle thereof in which the holder comprises a generally planar panel having a top surface, golf cart attaching means for attaching the panel to an upper member of a golf cart adjacent to a handle thereof, a well fixedly attached to the panel having an open end opening onto the top surface for receiving and releasably retaining a beverage container in a stable generally vertical orientation when the panel is attached to the upper member of the golf cart in a non-horizontal orientation, means for releasably attaching a scorecard to the panel, a cover, and means for attaching the cover to the panel so that the cover is movable between a closed position covering the scorecard and an open position for recording a score on the scorecard.

Preferably, the cover comprises an outer surface and means for releasably attaching the scorecard to the outer surface of the cover. Desirably, the cover comprises a clock for determining the time.

Certain of the foregoing and related objects are further readily obtained in a golf accessory holder attachable to an upper member of a golf cart adjacent to a handle thereof in which the holder comprises a generally planar panel comprising a top surface, golf cart attaching means for attaching the panel to an upper member of a golf cart adjacent to a handle thereof, means for releasably securing a scorecard to the panel, and a clock attached to the cover for determining the time. Preferably, the holder further comprises a cover, and means for movably attaching the cover to the panel so that the cover is movable between a closed position covering the scorecard and an open position for recording a score on the scorecard, and the clock is attachable to at least one of the panel and the cover.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustrations only, and not as a definition of the invention.

In the drawings, wherein similar reference numerals denote similar elements throughout the several views:

FIG. 7 is a cross-sectional view taken along line 7—7 in FIG. 5; and

FIG. 8 is a cross-sectional view taken along line 8—8 in FIG. 5.

DESCRIPTION OF THE PREFERRED EMBODIMENTS

Figure 1:
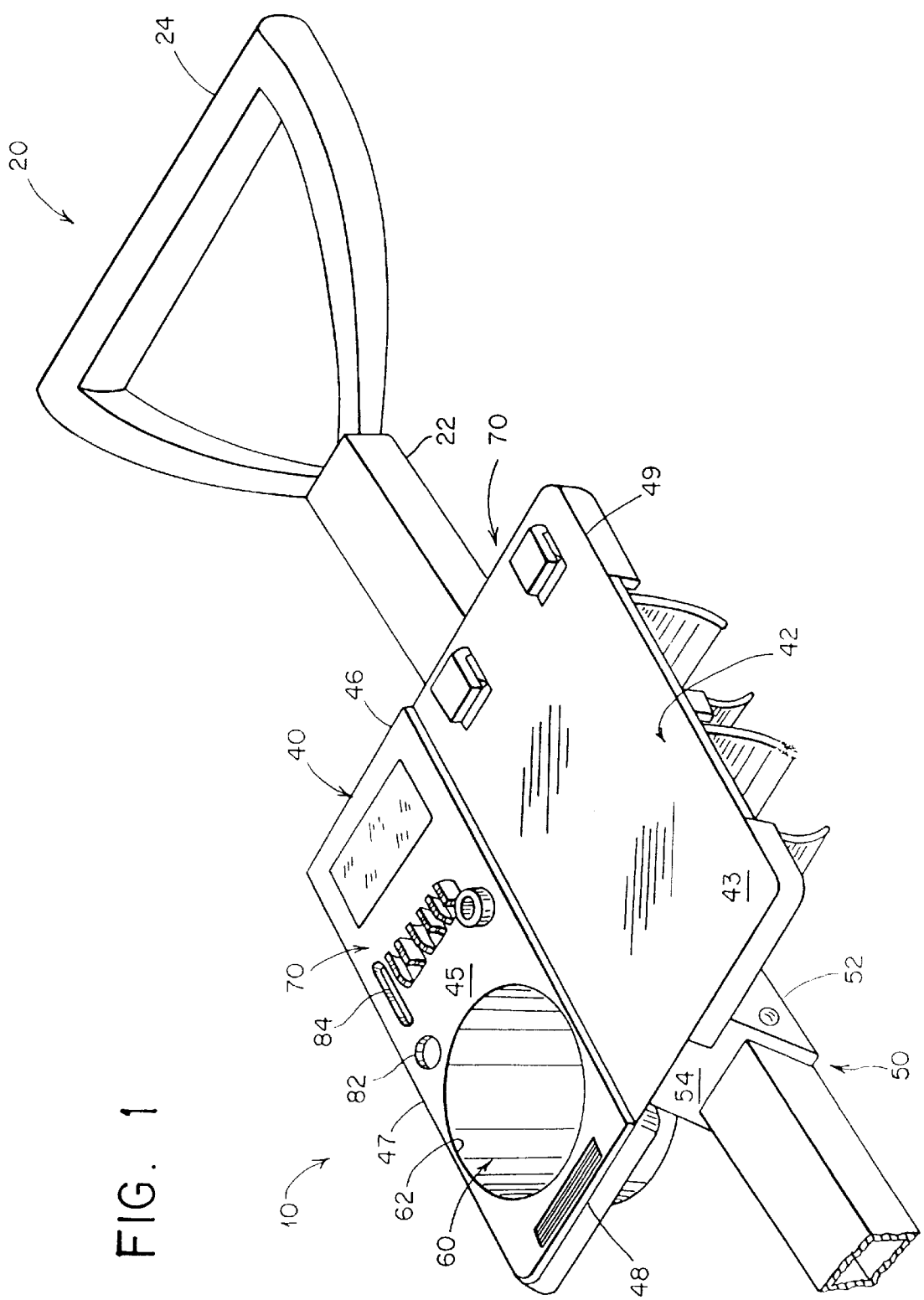
FIG. 1 is a perspective view of a golf accessory holder attachable to a golf cart according to the parent application.
Figure 2:
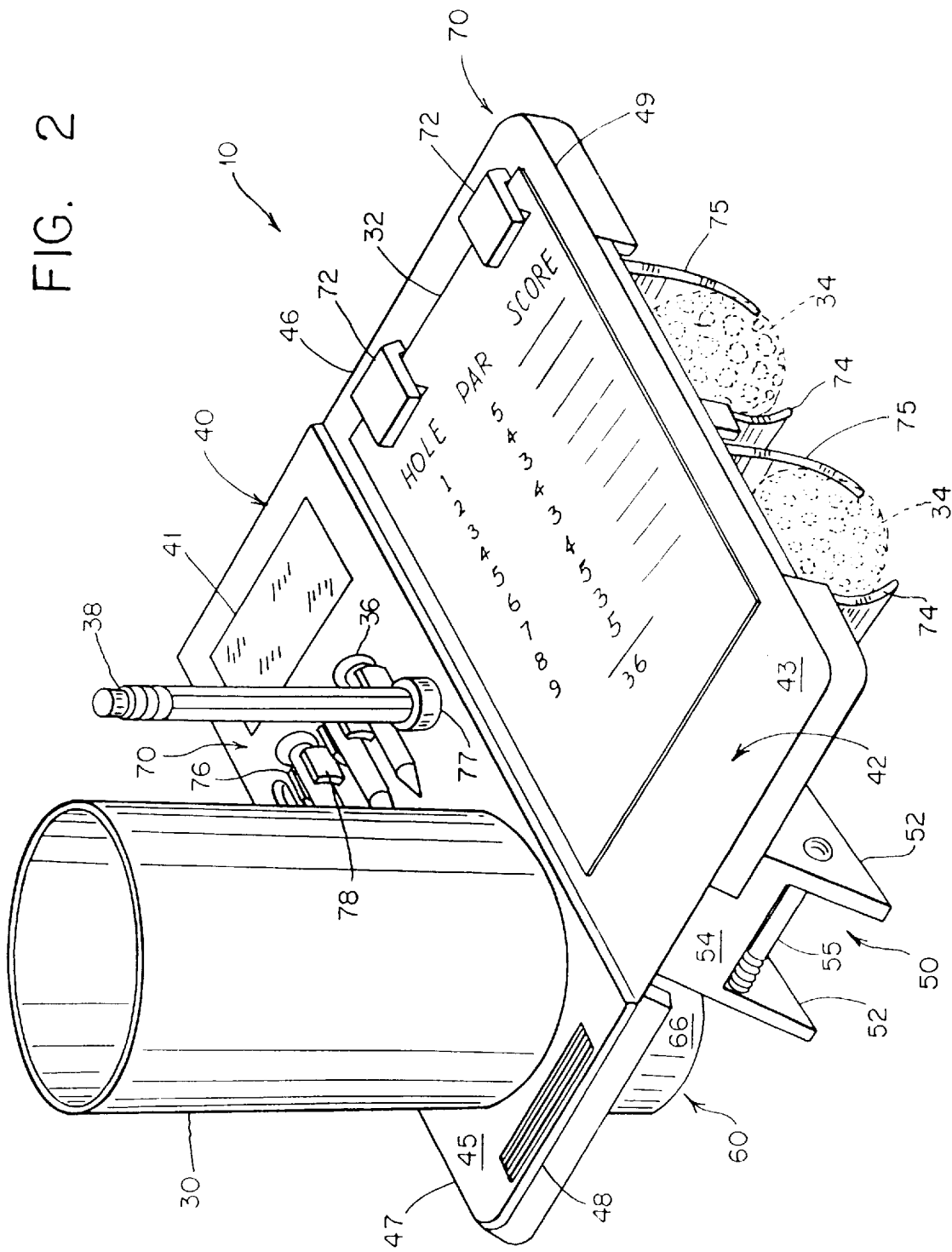
FIG. 2 is an enlarged perspective view of the golf accessory holder shown in FIG. 1.

Turning now to the drawings, therein illustrated in FIGS. 1 and 2 is a golf accessory holder 10 according to the parent application which attaches to an upper member 22 of a golf cart 20 (FIG. 1). As shown in FIG. 2, holder 10 is compactly configured for conveniently holding a beverage container 30, a scorecard 32, golf balls 34, golf tees 36, a pencil 38, and/or other golf accessories. Holder 10 is preferably mounted adjacent to a handle 24 of cart 20. It is appreciated that holder 10 is suitable for use with cart 20 which can be either manually operated or motorized, collapsible or non-collapsible.

Figure 3:
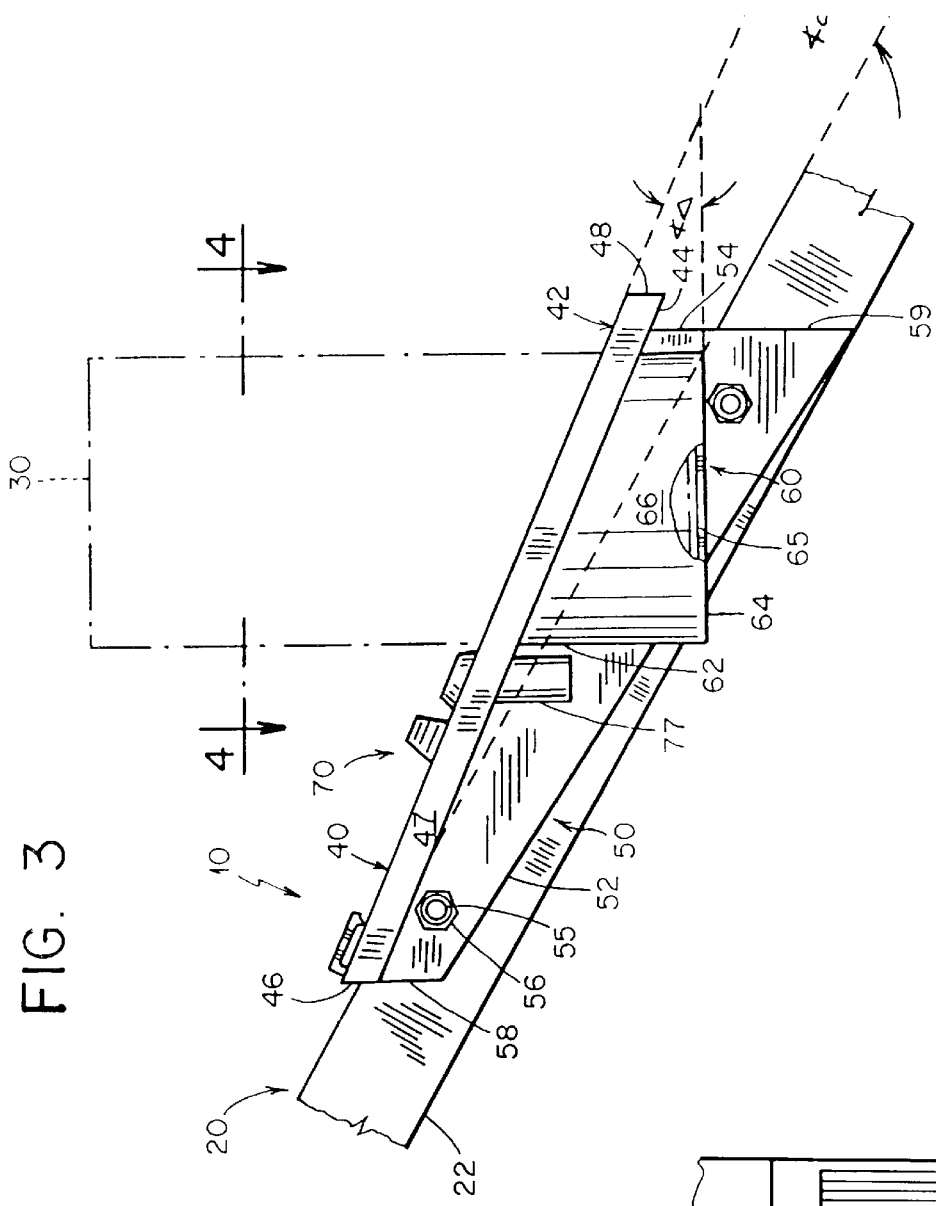
FIG. 3 is an enlarged fragmentarily illustrated, side elevational view of the golf accessory holder shown in FIG. 1.

With reference to FIGS. 1–3, holder 10 generally comprises a centrally supported rectangular planar member or panel 40 which overlies and straddles upper member 22 of cart 20. Operably attached to panel 40 is golf cart attaching means 50 for attaching panel 40 to cart 20, a well 60 for releasably retaining a beverage container 30 therein, and golf accessory holding means 70 for holding at least one golf accessory.

Specifically, panel 40 includes a top surface 42, a bottom surface 44 (FIG. 3), a top edge 46, a bottom edge 48, and two side edges 47 and 49. Desirably, panel 40 defines a first or "right" portion 43 for holding a scorecard 32 and an adjacent second or "left" portion 45 for holding a beverage container 30 and other golf accessories, each portion of which extending to opposite sides of upper member 22 of cart 20 and the details of which will be described in greater detail hereinafter.

As shown in greater detail in FIG. 3, golf cart attaching means 50 comprises two generally parallel and spaced apart legs 52 which downwardly depend from bottom surface 44 of panel 40 (only one of which is shown in FIG. 3). Legs 52 straddle and rest upon upper member 22 of cart 20 and are held thereto via nuts 56 and bolts 55 at the top end 58 and bottom end 59 thereof.

Preferably, legs 52 extend substantially all of the length between top edge 46 and bottom edge 48 of panel 40. Advantageously, legs 52 are generally wedge-shaped and a spacer 54 is disposed between lower ends 59 of legs 52 adjacent bottom edge 48 to position or elevate bottom edge 48 away from upper member 22 of cart 20 when panel 40 is attached to cart 20, i.e., to position panel 40 in a more horizontal orientation relative to upper member 22 which is disposed at a slight angle to vertical when cart 20 is at rest.

Specifically, top surface 42 is disposed at an angle α relative to upper member 22 of cart 20. Increasing angle α places panel 40 in a more horizontal orientation so as to make it easier to record a score on scorecard 32 (FIG. 2) when attached to holder 10, and also to aid in placing a beverage container in a generally vertical position as will be further described below.

Each leg 52 has holes (not shown) in corresponding alignment for receiving bolts 55 which extend through the holes in each leg 52 and attach to nuts 56 so as to securely attach holder 10 to upper member 22 of cart 20.

Figure 4:
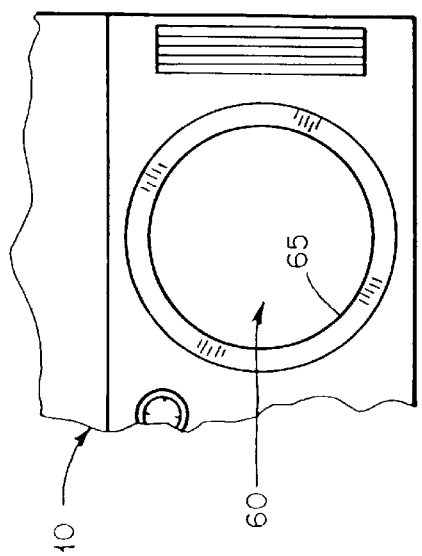
FIG. 4 is a view taken along line 4—4 of FIG. 3.

With reference again to FIGS. 1–4, well 60 comprises a generally cylindrical well depending from panel 40 for receiving and holding beverage container 30 in a stable generally vertical orientation when panel 40 is attached to upper member 22 of cart 20. As shown in FIG. 1, well 60 has an open upper end 62 opening on to top surface 42 of panel 40 and an open bottom end 64 (FIG. 3) joined by an upstanding cylindrical sidewall 66. Preferably, upper open end 62 is sized for receiving a beverage container 30 (FIG. 2) and open bottom end 64 is defined by an inwardly extending peripheral lip or flange 65 (FIG. 4) which serves as a step or edge for supporting the bottom of beverage container 30. Upper open end 62 is ovally-shaped when viewed normal to top surface 42.

As shown in FIG. 3, flange 65 lies within a plane disposed at an angle Δ to top surface 42 so that when panel 46 is attached to cart 20 flange 65 is disposed at a substantially level or horizontal orientation to support beverage container 30 in a stable vertical orientation. Although sidewall 66 is shown as being a continuous cylindrical surface, from the present description it is appreciated to those skilled in the art that a sidewall can have openings or slits. Likewise, flange 65 is shown as being continuous, however, it is appreciated that a flange can include one or more cutouts or the like, or alternatively a solid bottom can be provided.

As shown in FIG. 2, golf accessory means 70 comprises a pair of spaced-apart resilient clip members 72 which attach to upper surface 42 adjacent top edge 46 of panel 40. Clip members 72 are biased toward top surface 42 to secure an upper edge of scorecard 32 between clip 72 and top surface 42. Also, golf accessory holding means 70 comprises two sets of spaced-apart, paired, downwardly depending elongated curved members or fingers 74 and 75 attached to bottom surface 44 (FIG. 3) of panel 40 which frictionally and releasably retain golf balls 34 therebetween.

In addition, golf accessory holding means 70 includes a cylindrical sleeve 77 extending through top surface 42 to bottom surface 44 of panel 40 has an axial bore sized for releasably retaining pencil 38 therein. Further, golf accessory holding means 70 comprises three sets of spaced-apart, paired, upwardly extending elongated curved members or fingers 76 and 78 for frictionally and releasably retaining therebetween golf tees 36, which curved members 76 and 78 are attached to top surface 42 of panel 40. It is appreciated that a golf tee 36 can be equally retained in an aperture extending through top surface 42 to bottom surface 44. A name or product plate 41 is suitably attached to panel 40 adjacent top edge 46.

With reference again to FIG. 1, panel 40 includes a circular aperture 82 and an elongated slotted aperture 84, both extending through top surface 42 to bottom surface 44 and adjacent side edge 47, for attachment of other golf accessories, e.g., a clip on towel.

Preferably, holder 10 is fabricated from a plastic or polymeric material, and desirably, is injected molded. Advantageously, panel 40, golf cart attaching means 50, beverage container holding means 60, and golf accessory holding means 70 are integrally formed in a unit.

Figure 5:
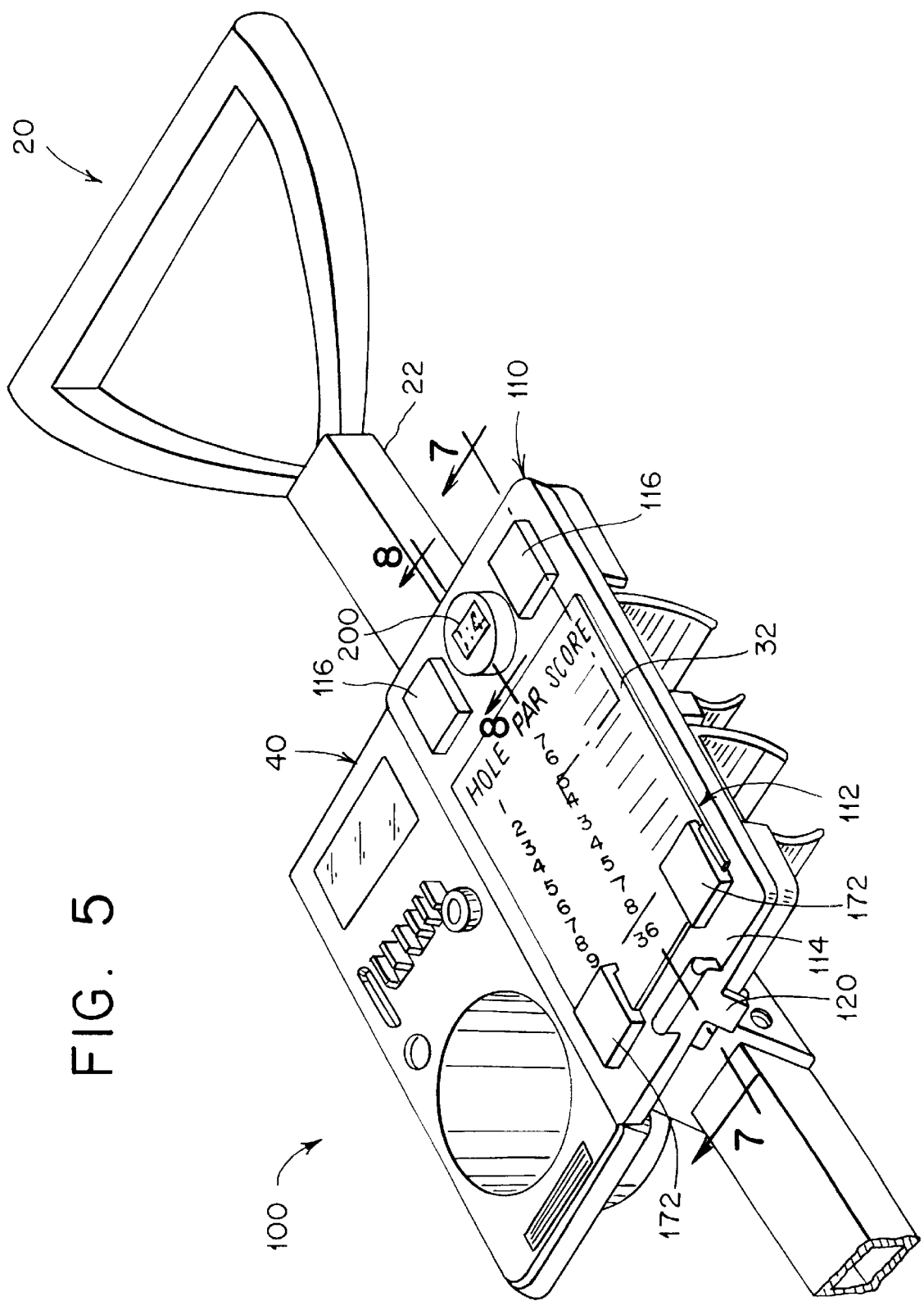
FIG. 5 is a perspective view of a golf accessory holder attachable to a golf cart according to the present invention.

Turning now to FIGS. 5–8, therein illustrated is one embodiment of a novel golf accessory holder 100 according to the present invention which attaches to an upper member 22 of a golf cart 20 (FIG. 5). While holder 100 is illustrated as comprising a pair of parallel legs 52 for attaching to upper member 22 of golf cart 20, it is appreciated that the holder can be suitably attached to upper member 22 by, e.g., clamps, straps, bolts or screws.

In this illustrated embodiment, holder 100 is similar to holder 10 (FIG. 1) with the exception that holder 100 provides an additional location for securing scorecard 32 to holder 100, as well as protection of scorecard 32 from the rain during play of a round of golf. Specifically, holder 100 comprises a cover 110 to which scorecard 32 may be releasably secured for readily recording a score or the number of strokes per hole during play of a round of golf, particularly during sunny weather (FIG. 5). In addition, cover 110 is pivotally attached to panel 40 so that cover 110 is movable to an open position, shown in FIG. 6, to expose a second location to secure scorecard 32, and upon closing cover 110, to provide protection of scorecard 32 from rain during play of a round of golf.

As shown in FIG. 5, cover 110 comprises an outer surface 112, and a pair of spaced-apart resilient clip members 172 which attach to outer surface 112 adjacent to a bottom edge 114 of cover 110. Clip members 172 are biased toward outer surface 114 to releasably secure a lower edge portion of scorecard 32 between clip members 172 and outer surface 114.

Referring again to FIG. 6, holder 100 comprises a pair of spaced-apart resilient clip members 72 which attach to upper surface 42 adjacent to top edge 46 of panel 40 and which provides another location for securing scorecard 32 to holder 100. Specifically, clip members 72 are biased toward top surface 42 to secure an upper edge of scorecard 32 between clip members 72 and top surface 42. Preferably, cover 110 is provided with a pair of square domed shaped portions 116, the undersides of which define recesses into each of which one resilient clip member 72 is receivable when the cover 110 is closed.

Figure 6:
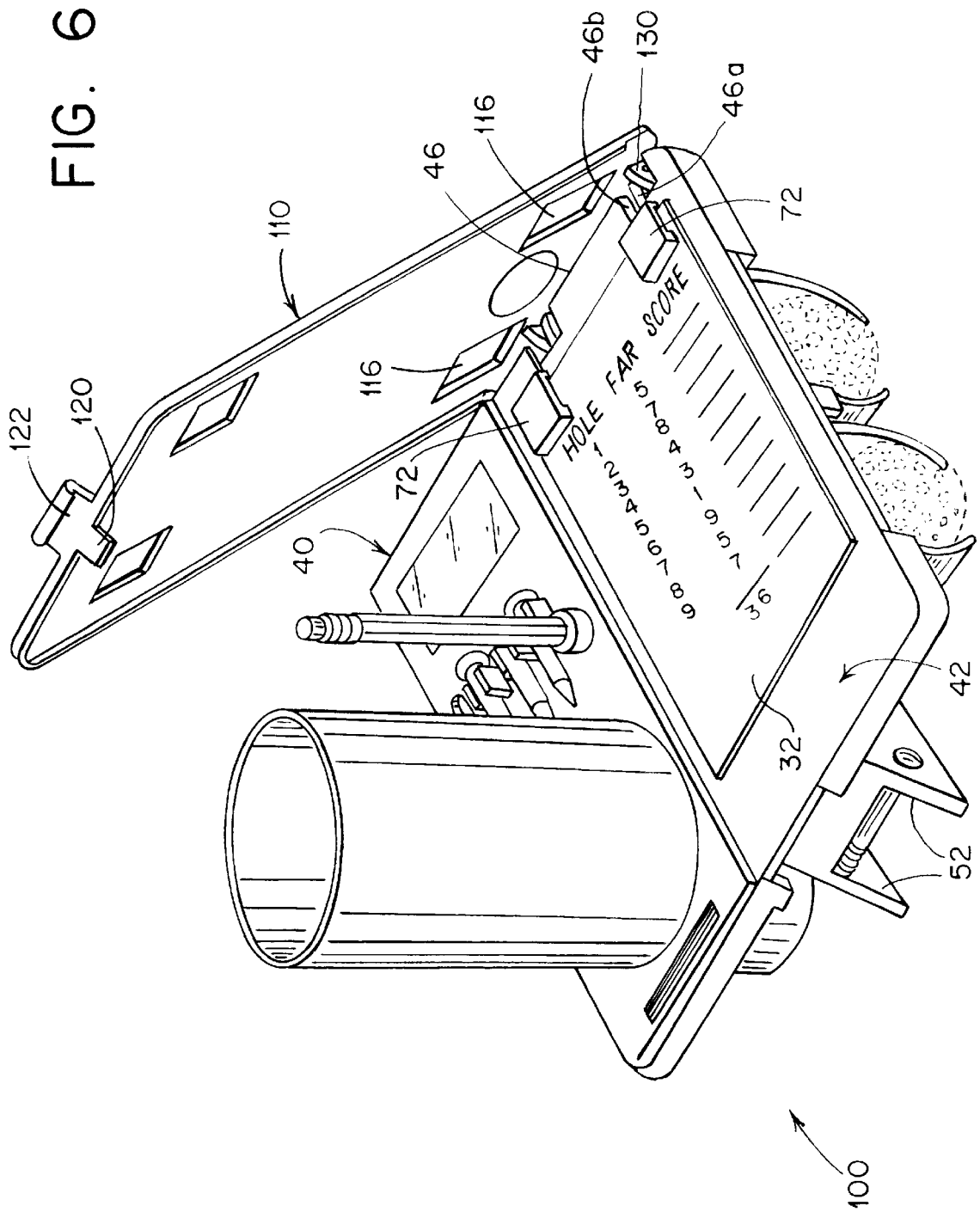
FIG. 6 is a perspective view of the golf accessory holder shown in FIG. 5 with the cover for protecting a scorecard illustrated in an open position.

As shown in FIGS. 5 and 6, and in particular FIG. 7, cover 110 preferably comprises a downwardly depending resilient tab 120 which releasably engages the edge of panel 40 in a snap-fit manner to retain cover 110 in a closed position. In particular, the lowermost portion of tab 120 is provided with a detent 121 which is biased to engage the bottom edge 48a of panel 40 and prevent cover 110 from being opened. Desirably, as shown in FIG. 7, cover 110 comprises an upwardly extending tab 122 adjacent to downwardly depending resilient tab 120 which, when upwardly extending tab 122 is moved or pivoted in the direction of arrow A, downwardly depending tab 120 moves or pivots in the direction of arrow B away from the lower edge of panel 40 to thereby allow cover 110 to be easily pivotally moved, in the direction of arrow C, to an open position.

As shown in FIGS. 6 and 7, cover 110 is hingedly attached to panel 40. Specifically, the upper portion of cover 110 is provided with a pair of downwardly depending tabs 130 (FIG. 6) and panel 40 comprises a pair of downwardly depending tabs 46a (FIG. 6), each of which are disposed adjacent to each other and connectable via a pin 140 for allowing pivotal movement between cover 110 and panel 40. Desirably, panel 40 adjacent upper edge 46 is provided with cutouts 46b (FIG. 6) which expose tabs 46 when viewed from above and through which downwardly depending tabs 130 pass. Advantageously, when cover 110 is placed in a closed position, the hinge connection of cover 110 to panel 40 is covered from view.

As shown in FIG. 5, preferably cover 110 further comprises a time piece or clock 200 which can be viewed to determine the time. Desirably, clock 200 is a digital, battery operated clock and is protected from the rain. For example, as shown in FIG. 8, clock 200 is encased between cover 110 and a removable and sealable plate 118. Advantageously, clock 200 is provided with multi-functions, e.g., to allow a golfer to keep time of each round and/or to keep score of each round.

Preferably, the cover is formed from a plastic or polymeric material. Desirably, cover 110 is transparent so that a scorecard secured to panel 40 is readily viewable through the cover.

Thus, while one embodiment of the present invention has been shown and described, it is obvious that many changes and modifications may be made thereunto without departing from the spirit and scope of the invention.

For example, from the present description it will be appreciated to those skilled in the art that other suitable means for releasably attaching a scorecard to the panel or the cover can be employed, e.g., one or more spring-biased clips. In addition, the placements of a beverage container, the golf balls, the golf tees, the pencil, and the clock may be suitably arranged relative to one another in other configurations on the panel.

Furthermore, from the present description it will be appreciated to those skilled in the art that the holder and cover may be sized and configured to only hold a scorecard and/or clock, e.g., does not include a well or means for holding other golf accessories. Also, it is appreciated that the cover may be slidably, pivotally, or hingedly attached to the panel via other suitable means, e.g., separate hinges, as well as the cover and panel may be attached to each other along the right or left side of the cover. In addition, the means for releasably attaching the cover in a closed position may include other suitable snap-fit engagement mechanisms or other releasable locks, e.g., a spring-biased latch or slidable locking catch, etc.

What is claimed is:

1. A golf accessory holder attachable to an upper member of a golf cart adjacent to a handle thereof, said holder comprising:

a generally planar panel comprising a top surface;

golf cart attaching means for attaching said panel to an upper member of a golf cart adjacent to a handle thereof;

means for releasably attaching a scorecard to said panel;

a cover, said cover comprising an outer surface and means for releasably attaching the scorecard to said outer surface of said cover; and means for attaching said cover to said panel so that said cover is movable between a closed position covering the scorecard and an open position for recording a score on the scorecard.

2. A holder according to claim 1, wherein said means for releasably attaching the scorecard to said panel comprises at least one resilient clip member attached to said top surface to secure the scorecard to said panel between said resilient clip and said top surface.

3. A holder according to claim 2, wherein said cover comprises an outer surface and at least one resilient clip member attached to said outer surface to secure the scorecard to said cover between said resilient clip and said outer surface.

4. A holder according to claim 3, wherein said panel and said cover comprise upper and lower edges, and said resilient clip member of said panel is disposed adjacent to an upper edge of said panel and said resilient clip member of said cover is disposed adjacent to a lower edge of said cover.

5. A holder according to claim 3, wherein said cover comprises a bottom surface having a recess disposed adjacent to and aligned with said resilient clip member of said panel when said cover is disposed in a closed position.

6. A holder according to claim 1, wherein said cover comprises means for releasably retaining said cover in a closed position.

7. A holder according to claim 6, wherein said means for releasably retaining said cover in a closed position comprises said cover comprising a downwardly depending resilient tab which releasably engages said panel in a snap-fit manner to retain said cover in a closed position.

8. A holder according to claim 7, wherein said cover comprises an upwardly extending tab adjacent to said downwardly depending resilient tab which, when said upwardly extending tab is pivoted, said downwardly depending tab disengages from said snap-fit engagement with said panel to thereby allow said cover to be moved to said open position.

9. A holder according to claim 1 wherein said means for attaching said cover to said panel comprises said cover being pivotal between a closed position covering the scorecard and an open position for recording a score on the scorecard.

10. A holder according to claim 9, wherein said means for attaching said cover to said panel comprises said panel comprising at least two downwardly depending tabs, said cover comprising at least two downwardly depending tabs, and said tabs being connectable via a pin.

11. A holder according to claim 1, wherein said cover is formed from plastic.

12. A holder according to claim 1, wherein said cover is transparent.

13. A holder according to claim 1, further comprising at least one pair of downwardly depending elongated curved members attached to said panel for frictionally and releasably retaining a golf ball therebetween, a cylindrical sleeve extending through said panel and having an axial bore sized for releasably retaining a pencil therein, and at least one pair of spaced-apart upwardly extending elongated curved members, attached to said top surface of said panel for frictionally and releasably retaining therebetween a golf tee.

14. A golf accessory holder attachable to an upper member of a golf cart adjacent to a handle thereof, said holder comprising:

a generally planar panel comprising a top surface;

golf cart attaching means for attaching said panel to an upper member of a golf cart adjacent to a handle thereof;

means for releasably attaching a scorecard to said panel comprising at least one resilient clip member attached to said top surface to secure the scorecard to said panel between said resilient clip and said top surface;

a cover comprising an outer surface and at least one resilient clip member attached to said outer surface to secure the scorecard to said cover between said resilient clip and said outer surface; and means for attaching said cover to said panel so that said cover is movable between a closed position covering the scorecard and an open position for recording a score on the scorecard.

15. A golf accessory holder attachable to an upper member of a golf cart adjacent to a handle thereof, said holder comprising:

a generally planar panel comprising a top surface;

golf cart attaching means for attaching said panel to an upper member of a golf cart adjacent to a handle thereof;

means for releasably attaching a scorecard to said panel;

a cover comprising means for releasably retaining said cover in a closed position comprising a downwardly depending resilient tab which releasably engages said panel in a snap-fit manner to retain said cover in a closed position.

means for attaching said cover to said panel so that said cover is movable between a closed position covering the scorecard and an open position for recording a score on the scorecard.

16. A golf accessory holder attachable to an upper member of a golf cart adjacent to a handle thereof, said holder comprising:

a generally planar panel comprising a top surface;

golf cart attaching means for attaching said panel to an upper member of a golf cart adjacent to a handle thereof;

means for releasably attaching a scorecard to said panel;

a cover; and means for attaching said cover to said panel so that said cover is movable between a closed position covering the scorecard and an open position for recording a score on the scorecard, said means for attaching said cover to said panel comprising said cover being pivotal between a closed position covering the scorecard and an open position for recording a score on the scorecard and said panel comprising at least two downwardly depending tabs, said cover comprising at least two downwardly depending tabs, and said tabs being connectable via a pin.

17. A golf accessory holder attachable to an upper member of a golf cart adjacent to a handle thereof, said holder comprising:

a generally planar panel having a top surface;

golf cart attaching means for attaching said panel to an upper member of a golf cart adjacent to a handle thereof;

a well fixedly attached to said panel having an open end opening onto said top surface for receiving and releasably retaining a beverage container in a stable generally vertical orientation when said panel is attached to the upper member of the golf cart in a non-horizontal orientation;

means for releasably attaching a scorecard to said panel;

a cover; and means for attaching said cover to said panel so that said cover is movable between a closed position covering the scorecard and an open position for recording a score on the scorecard.

18. A holder according to claim 17, wherein said cover comprises an outer surface and means for releasably attaching the scorecard to said outer surface of said cover.

19. A holding according to claim 17, wherein said cover comprises a clock for determining the time.

20. A holder according to claim 17, further comprising at least one pair of downwardly depending elongated curved members attached to said bottom surface of said panel, for frictionally and releasably retaining a golf ball therebetween, a cylindrical sleeve extending through said panel and having an axial bore sized for releasably retaining a pencil therein, and at least one pair of spaced-apart upwardly extending elongated curved members attached to said panel for frictionally and releasably retaining therebetween a golf tee.

21. A golf cart accessory holder attachable to an upper member of a golf cart adjacent to a handle thereof, said holder comprising:

a generally planar panel comprising a top surface;

golf cart attaching means for attaching said panel to an upper member of a golf cart adjacent to a handle thereof;

means for releasably securing a scorecard to said panel; and a clock attached to said panel for determining the time.

22. A holder according to claim 21, further comprising a cover, means for attaching said cover to said panel so that said cover is movable between a closed position covering the scorecard and an open position for recording a score on the scorecard, and wherein said clock is attachable to at least one of said panels and said cover.

23. A holder according to claim 21, wherein said clock is a digital.

24. A holder according to claim 21, wherein said cover comprises an outer surface and means for releasably attaching the scorecard to said outer surface of said cover.

25. A holder according to claim 21, further comprising at least one pair of downwardly depending elongated curved members attached to said panel for frictionally and releasably retaining a golf ball therebetween, a cylindrical sleeve extending through said panel and having an axial bore sized for releasably retaining a pencil therein, and at least one pair of spaced-apart upwardly extending elongated curved members attached to said panel for frictionally and releasably retaining therebetween a golf tee.

* * * * *